United States Patent [19]

Vigerie

[11] 4,118,054

[45] Oct. 3, 1978

[54] HYDRAULIC DEVICE FOR A STABILIZING BEAM IN A MACHINE USED ON UNEVEN TERRAIN

[75] Inventor: Robert Vigerie, Saint-Chamond, France

[73] Assignee: Creusot-Loire, Paris, France

[21] Appl. No.: 795,541

[22] Filed: May 10, 1977

[30] Foreign Application Priority Data

May 12, 1976 [FR] France ............................... 76 14318

[51] Int. Cl.$^2$ ............................................... B60S 9/00

[52] U.S. Cl. .................................... 280/765; 212/145

[58] Field of Search ................. 280/764, 765; 212/145

[56] References Cited

U.S. PATENT DOCUMENTS

| | | | |
|---|---|---|---|
| 2,926,889 | 3/1960 | Obes | 280/765 |
| 3,007,717 | 11/1961 | Noly | 280/765 |
| 3,550,506 | 12/1970 | Gardenhour | 212/145 |
| 3,743,108 | 7/1973 | Visser | 280/765 |
| 3,801,068 | 4/1974 | Kopas | 280/765 |
| 3,856,152 | 12/1974 | Parrett et al. | 212/145 |
| 3,901,395 | 8/1975 | King | 212/145 |
| 3,945,666 | 3/1976 | Fritsch | 280/765 |

*Primary Examiner*—Lawrence J. Oresky
*Attorney, Agent, or Firm*—Haseltine, Lake, & Waters

[57] ABSTRACT

In a machine for use on uneven terrain having a stabilizing beam providing a lateral extension of the chassis of the machine and having a support jack mounted at each end thereof and movable relative thereto between an operating position in which the jack is vertical and bears on the ground through the intermediary of a sole plate attached to the end of the piston rod of the support jack and a position in which the jack is substantially horizontal and located within the stabilizing beam, a double actuating actuator jack is provided with its cylinder pivoted to the stabilizing beam and its piston rod pivoted to the cylinder of the support jack, and an hydraulic actuating device is provided comprising supply and take-off conduits for pressurized liquid connected to the chambers of the support and actuator jacks through three pressure sensitive non-return valves such that during movement of the support jack to its operating position, the support jack is extended only when the actuator jack is fully extended and during movement of the support jack to its stowed position, the actuator jack is not retracted until the support jack is fully retracted.

7 Claims, 5 Drawing Figures

HYDRAULIC DEVICE FOR A STABILIZING BEAM IN A MACHINE USED ON UNEVEN TERRAIN

Figure 1:
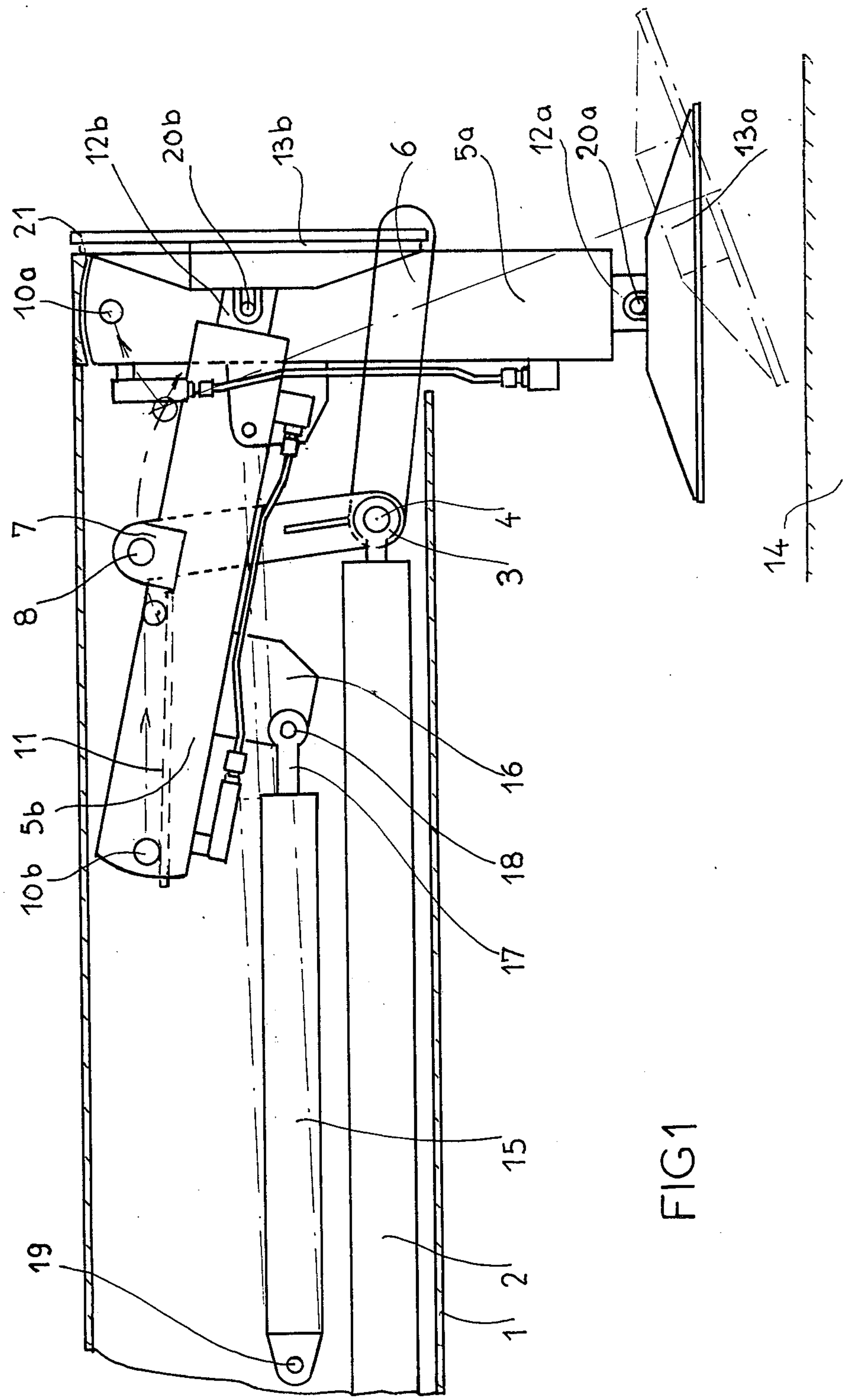

The invention is concerned with a hydraulic actuating device for use with a stabilising beam for machines used on uneven terrain, the beam providing a sideways extension of the chassis of the machine.

The stabilising beams fitted to movable handling machinery such as movable cranes are made in the form of beams which provide a sideways extension of the chassis of the machine and which have at the end a support jack which can be deployed to bear on the ground through the intermediary of sole plates with a large surface area, deployment of the jacks continuing until the wheels of the machine are raised from the ground, so that when the machine is in use it is supported in a stable manner on the support jacks. If the machine is to travel over uneven terrain, the support jacks must be capable of being stowed in a position which will not hamper movement of the machine. To achieve this, the support jacks, which are usually vertical when in use, may be swung into a horizontal position in which they are retracted inside the stabilising beam, which may be in the form of a box girder, until the sole plates close off the outer ends of the stabilising beams.

These stabilising beams are usually of telescopic construction, with a support beam sliding inside a box girder which is attached to the chassis of the machine. When the machine reaches its working site, the support beam must be slid out until the end at which the support jack is mounted is over the spot on which the jack is to bear, and the support jack must be set in its vertical working position, which can be done before or after the support beam is deployed.

For example, in one known form of stabilising device, the support beam is slid out from the box girder to a predetermined position in which it is stopped by an abutment which locks it in the working position, the jack which advances the support beam continuing to operate so that further advance of its piston rod swings the support jack into its vertical position, in which the sole plates can be set on the ground.

In another known device the same jack positions the support beam and the support jack, but in this case the setting and locking of the support jack in the vertical position take place before the support beam is slid out in the box girder. This device has an advantage over that previously described in that the support jack is set and locked in position at the very beginning of the deployment of the stabilising beam, so that this deployment can continue by running the support beam out to the required distance, so that the support jack can be brought into contact with the ground at the required distance from the chassis of the machine.

Also, the locking of the jack in the vertical position is carried out automatically at the very beginning of the movement of the support beam in the box girder, and by mechanical devices, so that the device is highly safe in use.

However, a device of this type has the disadvantage that it has mechanical components which are relatively delicate and which can be difficult to service, which is a definite disadvantage when it comes to machinery for use in the construction industry.

Furthermore, wear of the mechanical components eventually produces faulty operation of the machine.

Finally, the setting of the support jack in the vertical position at the very beginning of the movement of the support beam may be a disadvantage in that it may impede deployment of the beam in situations where there is a vertical obstacle between the machine and the spot at which the support jack is to rest.

In another known device for actuating a stabilising system for machines, a double-acting actuator jack for setting the support jack in position is supplied through a hydraulic circuit which also feeds the support jack, the various stages of deployment being controlled by sequence valves responsive to the pressure in the jack chambers. Such a device cannot provide complete safety of operation because there is nothing to prevent the support jack being set down in a poor position if, for example, the actuator jack is mechanically locked.

According to the invention there is provided a hydraulic actuating device for use with a stabilising beam for a machine for use on uneven terrain, the stabilising beam providing a lateral extension of the chassis of the machine and having a support jack mounted on the end of the stabilising beam remote from the machine chassis such that the support jack is movable between an operating postion in which the jack is vertical and bears on the ground through the intermediary of a sole plate attached to the end of the piston rod of the support jack and a position in which the jack is substantially horizontal and located within the stabilising beam, said device including a double-acting actuator jack arranged with its cylinder pivoted to the stabilising beam and its piston rod pivoted to the cylinder of the support jack, said actuator jack being connected to a hydraulic circuit which is also connected to said support jack and includes a first, a second and a third non-return valve and a first and a second conduit for supply and take-off of pressurised fluid, said first conduit being connected directly by branch conduits to a first one of the chambers of said support jack and the actuator jack on that side of the respective piston which is subjected to the action of the pressurised hydraulic fluid to retract the piston rods of said jacks, and said second conduit being connected directly by branch conduits to the second one of the chambers of said jacks, wherein said non-return valves are pressure-sensitive, and:

said first valve is connected in the conduit connected to said second chamber of said actuator jack and is normally open in the sense which admits fluid to that chamber, said first valve being opened in the opposite sense in response to a predetermined pressure in a conduit connected to said first chamber of said actuator jack, said second valve is connected in the conduit connected to said second chamber of said support jack and is normally open in the sense which admits fluid to that chamber, said second valve being opened in the opposite sense in response to a predetermined pressure in a conduit connected to the conduit connected to said first chamber of said actuator jack, said third valve is connected in the conduit connected to said second chamber of said support jack between said second valve and said second fluid supply and take-off conduit and is normally open in the sense which permits fluid to be exhausted via said second conduit, said third valve being opened in the opposite sense in response to a predetermined pressure in a conduit connected to a chamber inside said piston rod of said actuator jack which chamber opens into said first chamber of said actuator jack when said piston rod is retracted and opens into a conduit connected to said second chamber of said actuator jack when said piston rod is advanced, and said predetermined pressure at which said first valve is operated is higher than said predetermined pressure at which said second valve is operated.

The invention will be more fully understood from the following description of an embodiment thereof, given by way of example only, with reference to the accompanying drawings.

In the drawings:

FIG. 1 is a partial cross-section through the end of a stabilising beam fitted with a support jack and an embodiment of an hydraulic actuating device in accordance with the invention; and FIGS. 2 to 5 show diagrammatically the position of the various components of the hydraulic actuating device during the various stages of a cycle in which the support jack is set in position and then retracted.

FIG. 1 shows the end of a support beam 1 constituting the movable part of a telescopic stabilising beam which includes a box girder which is not shown and the support beam 1 which slides in the box girder. The support beam 1 is moved in and out of the box girder by means of a jack 2 of which the piston rod 3 is pivoted to a spindle 4 rigidly attached to the end of the support beam. The end of the cylinder of the jack 2 which is not shown is pivoted to a spindle attached to the box girder in which the support beam 1 slides.

A support jack 5 is attached to the end of the support beam 1 by means of links 6 pivoted to the jack 5 by a spindle 8 rotatably mounted in a bracket 7 attached to the jack 5 and to the support beam by the spindle 4. The cylinder of the support jack 5 carries two journals 10 which run on ramps 11 attached to the side walls of the beam 1, which is of rectangular cross-section, when the support jack 5 is moved. The piston rod 12 of the support jack carries a sole plate 13 which rests on the ground 14 when the support jack is in its operating position, in which the jack 5 is vertically arranged at the end of the beam 1 in the position which is indicated at 5*a* in FIG. 1, the machine for which the beam 1 provides a sideways extension being raised from the ground by the support jacks at the ends of the various stabilising beams.

A bracket 16 attached to the cylinder of the jack 5 carries a spindle 18 on which is pivoted the piston rod 17 of an actuator jack 15, the cylinder of which is attached to the support beam 1 by a spindle 19.

The support jack 5 and the actuating system for moving it are shown in two positions, the reference numbers of the various component parts bearing the suffix *a* when shown in the operating position with the jack vertical at the end of the support beam 1, and the suffix *b* when shown with the jack in the retracted position, in which the jack cylinder is virtually horizontal and withdrawn inside the support beam 1, the sole plates 13, which are pivoted to the piston rod of the jack 5 at 20, then closing off the end face of the support beam 1.

The top of the cylinder of the jack 5 is part-spherical, and when the jack is in the vertical position this surface engages a part-spherical surface 21 on the beam 1.

FIG. 1 also shows the paths of movement of the axes of the journals 10 and of the bracket 16 when the jack 5 is moved from the rest position (5*b*) in which it is virtually horizontal inside the beam 1 to the working position (5*a*) in which it is vertical at the end of the beam.

Reference will now be had to FIGS. 2 to 5, in order to describe the advance and the retraction of the support jack and the hydraulic circuit which feeds the actuator jack 15 and the support jack 5, these jacks being able to operate only in accordance with a predetermined sequence which ensures complete safety during advance and retraction of the support jack.

As shown in FIGS. 2 to 5, the hydraulic circuit controlling the jacks 5 and 15 includes a conduit 30 which can be used for hydraulic fluid delivery or take-off, and a similar conduit 31, these two conduits being connected through a three-way valve (not shown) to a reservoir of pressurised hydraulic fluid and a sink for the fluid. By operating valves connected in the conduits 30 and 31, it is possible to supply the hydraulic circuit with fluid through the conduit 30 and remove the fluid through the conduit 31 or vice versa.

Two branch conduits 32 and 33 are connected to the conduit 30, the conduit 32 being connected to one chamber 36 of the jack 15 and the conduit 33 being connected to one chamber 41 of the jack 5. Likewise, two branch conduits 34 and 35 are connected to the conduit 31, one being connected to the other chamber 45 of the jack 5 and the other being connected to the other chamber 44 of the jack 15.

A non-return valve 37 is connected in the conduit 32, and is normally open in the sense which feeds the chamber 36 of the jack 15, this chamber of the double-acting jack being on the side of the piston 38 which is subjected to the hydraulic fluid under pressure in order to extend the piston rod 17 of the jack 15. Two non-return valves 39 and 40 are connected in series in the conduit 33, the valve 39 normally being open in the sense which enables fluid to be taken from the chamber 41 of the jack 5 to the conduit 30. The non-return valve 40 is located between the valve 39 and the chamber 41 of the jack 5, which is the chamber of the double-acting jack 5 on the side of the piston 42 which is subjected to the hydraulic fluid under pressure in order to extend the piston rod 12 of the jack, to set the sole plates on the ground, and this valve 40 is normally open in the sense which feeds hydraulic fluid to this chamber 41.

The chamber 36 of the jack 15 will hereinafter be referred to as chamber B of jack 15, and chamber 41 of the support jack 5 will likewise be referred to as chamber B of the jack 5.

The other chambers of these jacks, i.e. those on the side of the piston which enable the piston rods of the jacks to be retracted, will be referred to as chamber A of the jack in question, chamber A of jack 15 being chamber 44 and that of jack 5 being chamber 45.

The valves 37, 39 and 40 are connected to respective conduits 46, 47 and 48, and are opened in the sense opposite to the normal one when the pressure in the respective one of these three conduits exceeds a predetermined value.

The conduits 46 and 48 are connected together and to the conduit 34 which branches from the conduit 31, which is itself connected to chamber 44 of the actuator jack 15. The valves 37 and 40 are set to operate at different pressure values, that for the valve 37 being higher than that for the valve 40. These two valves are controlled by a pressure which is the same as that in the chamber A (44) of the actuator jack 15. The operating conduit 47 of the valve 39 is connected to a passage 50 extending along the inside of the piston rod 17 of the jack 15, and opening into the chamber 44 at a point close to the piston 38 when the piston is retracted into the cylinder of the jack 15.

That part of the cylinder of the jack 15 which defines the chamber 44 is closed off by an end plate 51 through which the piston rod 17 passes, and in which a passage 52 is formed, the passage opening into the opening in plate 51 through which the piston rod 17 passes. A conduit 53 is connected in fluid-tight manner to the passage 52. The other end of the conduit 53 is connected to the conduit 32 which communicates with chamber 36 of the jack 15.

The chamber 45 of the support jack 5 is closed at the end remote from the piston 42 by an end plate 54 through which the piston rod 12 passes.

The branch conduits 34 and 35 from the conduit 31 are connected directly to chambers 44 and 45, without the use of non-return valves.

Reference will now be had to all of FIGS. 1 to 5, in order to describe a complete cycle of operations, including the deployment of the support jack 5 from its stowed position inside the beam 1, and the retraction of the support jack 5 into the support beam 1 back to its starting position in which the sole plates 13 bear on the end face of the beam 1.

In FIGS. 2 to 5, those parts of the hydraulic circuit and those of the jack chambers which contain fluid under pressure are shown shaded. The parts of the circuit and the jack chambers in which the fluid is unpressurised are unshaded.

Figure 2:
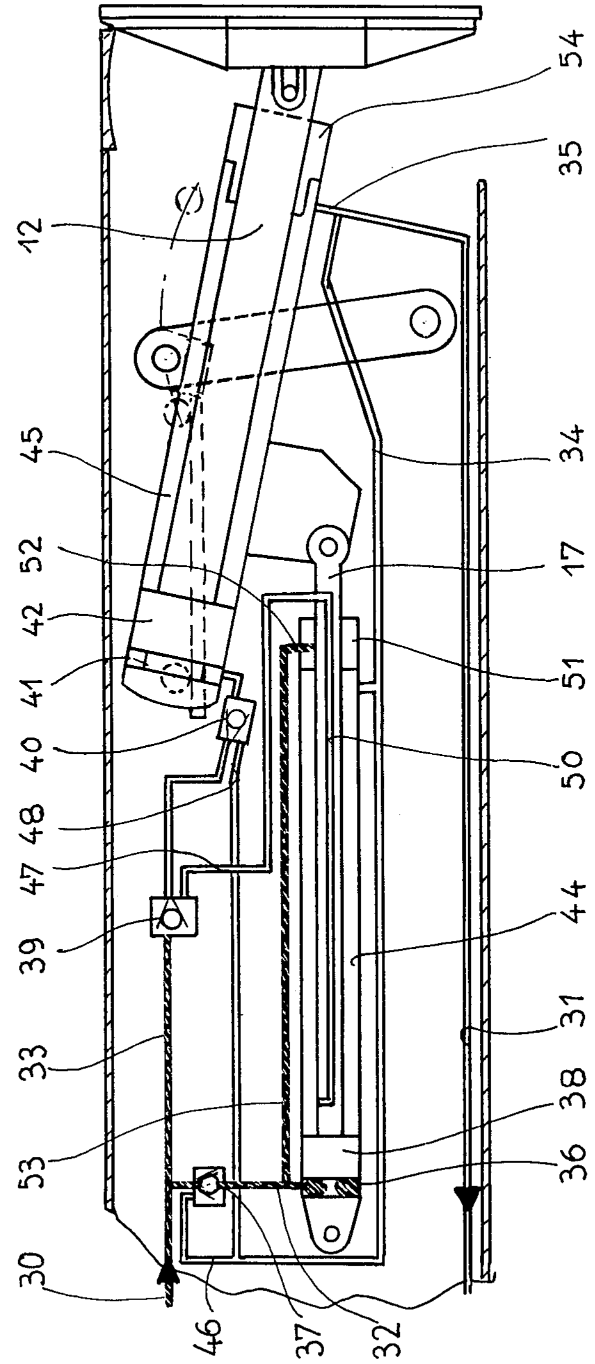

With the support jack in the position shown in FIG. 2 in which the conduit 30 is connected to the pressurised fluid source and the conduit 31 is connected to the fluid sink, hydraulic fluid is fed to the chamber 36 of the jack 15 through conduits 30 and 32, the valve 37 opening in its normal sense because its operating conduit 46 is connected to the chamber 44 and to the conduit 34 which is itself connected to the fluid sink through the conduit 31. The non-return valve 39 is however closed as its operating conduit 47 is, with the jack in the position shown in FIG. 2, connected to the unpressurised chamber 44, so that the chamber 41 of the support jack is isolated from the hydraulic fluid supply circuit by the valve 39. The pressurised fluid flowing into the chamber 36 causes the piston 38 to move along the cylinder of the jack and the piston rod 17 to be extended from the cylinder of the jack 15. Fluid in the chamber 44 is driven out through the conduit 34 and the take-off conduit 31. The movement of the piston rod 17 of the actuator jack 15 causes the cylinder of the jack 5 to move, the journals 10 rolling and sliding along the ramps 11 on the side walls of the support beam 1. The jack 5 moves forward and rotates, until the point at which the journals 10 leave the ramps 11, whereupon the jack 5 merely rotates about the spindle 4 of the link 6. The distance moved by the piston rod 17 is such that at the end of its movement, when the piston 38 abuts against the end plate 51, the jack 5 is in a vertical position.

At the end of the forward movement of the piston rod 17, the outlet of the passage 50 in the piston rod is aligned with the passage 52 formed in the end plate 51. The conduit 47 connected to the passage 52 is then at the pressure of the fluid in conduit 53, i.e. at the supply pressure of conduit 32, so that the valve 39 is operated to open to permit flow of hydraulic fluid from the conduit 33.

It will be appreciated that the conduits, such as conduit 47, which are displaced during the advance of the piston rod 17 are in the form of flexible conduits, to permit the required extension to take place.

The opening of the non-return valve 39 delivers fluid to the valve 40, which opens in its normal sense to supply the fluid to the chamber B (41) of the support jack 5. The supply of pressurised fluid to the chamber 41 causes the piston 42 to be moved along the cylinder of the jack 5 and the piston rod 12 to be extended, chamber 45 being in communication with the take-off conduit 31.

Figure 3:
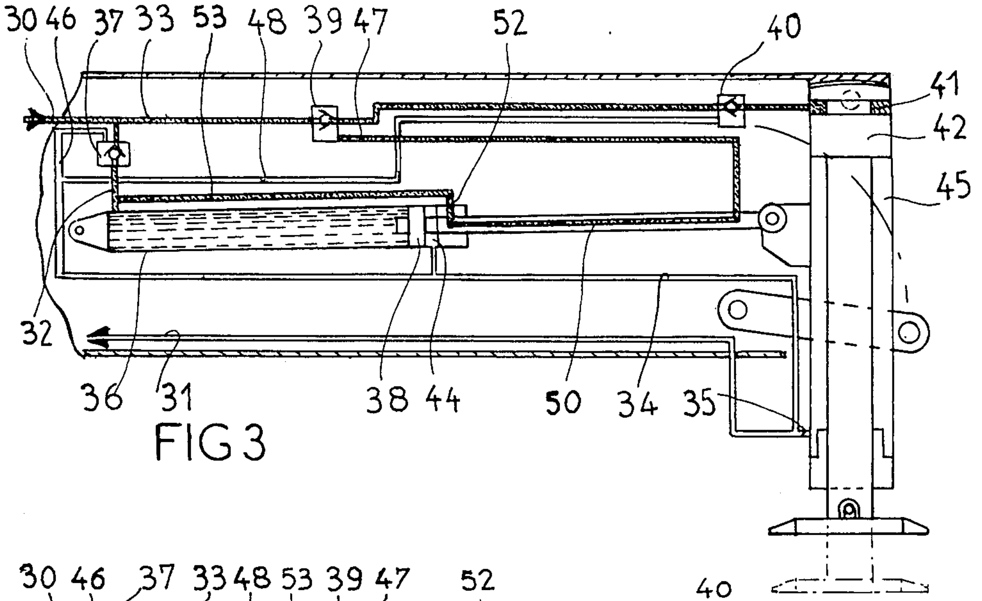
Figure 4:
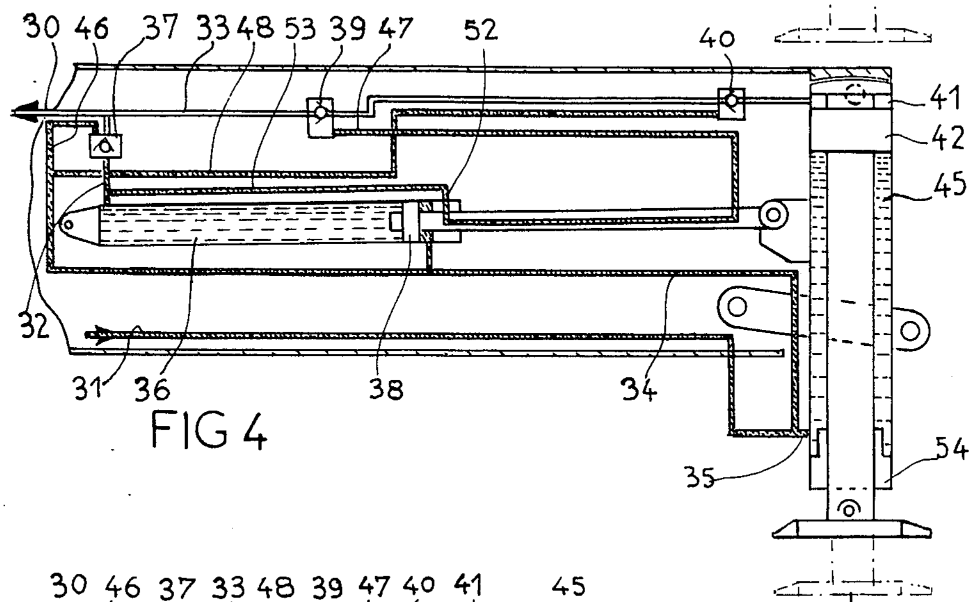

Extension of the piston rod 12 with the sole plate 13 at its free end continues until the sole plate 13 touches the ground 14, further movement then causing the beam 1 to be raised relative to the ground 14 by the action of the pressurised fluid delivered to chamber 41 of the support jack 5 (FIG. 3). As the support jacks on the various support beams of the machine touch the ground, the wheels of the machine are lifted from the ground, so that the machine is stably supported on the various sole plates, the support jacks 5 being locked in the vertical position by the actuator jack 15, the chamber 36 of which is kept pressurised by the valve 37 which prevents the hydraulic fluid escaping, whatever the pressure conditions in the conduit 30, by the link 6, and by the part-spherical top of the jack engaging the part-spherical surface 21 on the support beam 1. The position of the piston rod 12 of the support jack 5 is also stable, whatever the pressure conditions in the conduit 30, since the non-return valve 40 maintains the pressure in chamber 41 of the jack 5 whatever the fluid supply situation.

It will therefore be seen that the device described enables the support jack to be set and locked in the vertical position without any risk of misoperation, because the piston rod 12 of the jack 5 can only be advanced once the piston 38 of the jack 15 reaches the end of its run, at which point the cylinder of the jack is vertical.

The machine can therefore be supported in stable equilibrium, the weight of the machine balancing the pressure of the hydraulic fluid on the pistons of the support jacks.

When the support jack 5 is to be retracted inside the support beam 1, to be in the position shown in FIG. 2, if for example the machine is to be moved to a new site, the conduit 30 is connected to the hydraulic fluid sink and the conduit 31 to the pressurised fluid source. To start with, the various component parts are in the positions shown in FIG. 3, the sole plate being in contact with the ground, i.e. in the position shown in chain-dotted outline in FIG. 3.

Figure 5:
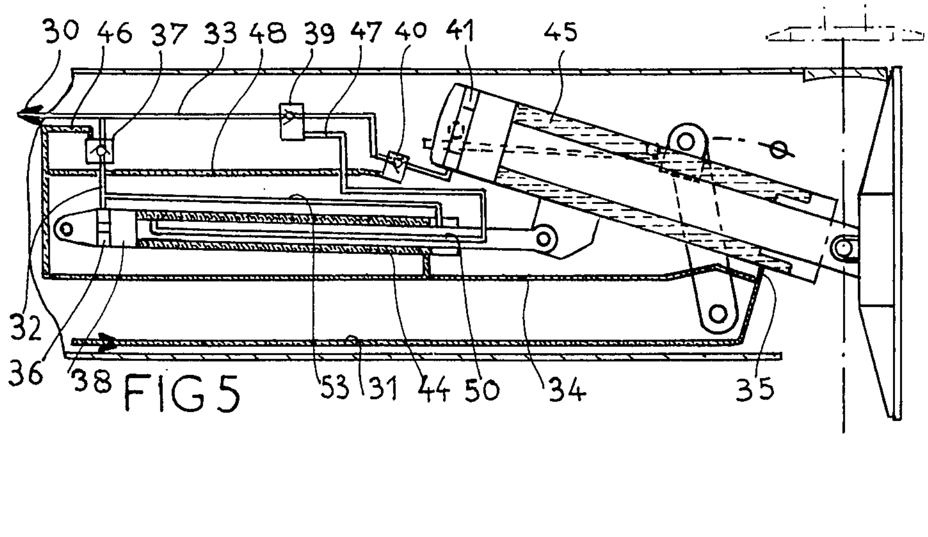

Delivery of pressurised fluid to conduit 31 pressurises the conduit 34, chamber 44 and conduits 46 and 48, as well as conduit 35 and chamber 45. Pressurisation of conduit 48 operates the valve 40 to open it in the sense which enables fluid to escape from chamber 41 of jack 5 to the outlet conduit 30. The pressure in the conduit 46 is too low to operate the valve 37, however, and the latter remains closed, to maintain the pressure in the chamber 36 of the jack 15. The supply of pressurised fluid to the chamber 45 at the same time as the valve 40 is opened causes the piston 42 to move in the sense which retracts the piston rod 12 into the cylinder of the jack 5, so that the machine is set down on its wheels and the jack raises the sole plate 13 to the position shown in FIG. 4. When the piston 42 abuts the upper end of the jack 5, the pressure continues to rise in that part of the circuit including chamber 45 and conduits 34 and 46, until it reaches a value sufficient to open the valve 37, which releases the fluid contained in the chamber 36 of the jack 15, so that the delivery of pressurised fluid by the conduit 34 to the chamber 44 and the take-off of fluid through the conduit 30 retracts the piston 38, to withdraw the support jack 5 to the stowed position inside the beam 1, as shown in FIG. 5.

The retraction of the jack 5 into the beam 1 is the reverse of the movement described for advancing and setting the jack in position, by means of the links 6, journals 10 and ramps 11.

Pressurisation of the conduit 31 is maintained until the sole plate 13 touches the end face of the beam 1.

The continuing pressure in the conduit 31 causes the jack 5 to be held in position by the actuator jack 15, and the piston rod 12 of the jack 5 to be held in the retracted position, the pressurised fluid filling chamber 44 of jack 15 and chamber 45 of jack 5.

The machine is then ready to be moved to another site.

It will be appreciated that the hydraulic actuator device described above enables all possibility of misoperation to be eliminated, during both the retraction and the extension of the support jacks, retraction of the jack 15 into the beam 1 being impossible until the piston rod of the support jack 5 is retracted.

The hydraulic actuating device described above is, generally speaking, intended for use with a telescopic support beam of the type shown in FIG. 1, in which the support beam slides within a box girder rigidly attached to the chassis of the machine, by the action of a jack like the jack 2, with its cylinder connected to the box girder and its piston rod connected to the support beam in a pivotal manner. The control circuit for this jack 2 is entirely separate from that for the actuating jack 15, so that the support jack can be manoeuvred and positioned at any point along the sliding path of the support beam.

It will also be appreciated that one advantage of the above described device is to do away with all mechanical components, with the exception of the device for guiding the advance and rotation of the support jack into its vertical position, and wear of this device has no significant effect on the proper operation and locking of the support jack. Operation of the support jack is therefore safer, and is no longer affected by the wear of mechanical components which might hinder the proper execution of the sequence of events required to advance or retract the jack.

The above described device also overcomes the constraints imposed by an actuating device of purely mechanical construction, having a high level of operational safety, especially where the locking of the jack in the vertical position while it is set down is concerned, and, when used with a telescopic beam, enabling the support jack to be operated independently of the support beam at any position of the beam relative to the chassis of the machine.

The invention is not intended to be limited to the embodiment which has just been described, but covers all variations thereof, and the use of equivalent means. Thus the journals, ramps and links which are used to guide and rotate the support jack during its extension and retraction may be replaced by a sheath in which the cylinder of the support jack slides, the cylinder being rotatably attached to a spindle arranged transversely of the end of the support beam. The hydraulic device described above may be used in association with mechanical locking devices, such as the part-spherical surface 21 on the support beam, but such devices are not required for proper operation of the hydraulic device, although they are useful in certain circumstances. The hydraulic actuating device which has been described as used with a support beam which is slidable within a box girder, may also be used with a support beam fixed to the chassis of the machine, the support jack being mounted at its free end.

Finally, the invention is not only applicable to mobile cranes, but to all forms of handling machines used in uneven terrain, and even to road transport vehicles fitted with lifting devices, or to mobile drillings rigs, which call for great stability when in use combined with the ability to move freely over all kinds of terrain.

What is claimed is:

1. A hydraulic actuating device for use with a stabilising beam for a machine for use on uneven terrain, the stabilising beam providing a lateral extension of the chassis of the machine and having a support jack mounted on the end of the stabilising beam remote from the machine chassis such that the support jack is movable between an operating position in which the jack is vertical and bears on the ground through the intermediary of a sole plate attached to the end of the piston rod of the support jack and a position in which the jack is substantially horizontal and located within the stabilising beam, said device including a double-acting actuator jack arranged with its cylinder pivoted to the stabilising beam and its piston rod pivoted to the cylinder of the support jack, said actuator jack being connected to a hydraulic circuit which is also connected to said support jack and includes a first, a second and a third non-return valve and a first and a second conduit for supply and take-off of pressurised fluid, said first conduit being connected directly by branch conduits to a first one of the chambers of said support jack and the actuator jack on that side of the respective piston which is subjected to the action of the pressurised hydraulic fluid to retract the piston rods of said jacks, and said second conduit being connected directly by branch conduits to the second one of the chambers of said jacks, wherein said non-return valves are pressure-sensitive, and:

said first valve is connected in the conduit connected to said second chamber of said actuator jack and is normally open in the sense which admits fluid to that chamber, said first valve being opened in the opposite sense in response to a predetermined pressure in a conduit connected to said first chamber of said actuator jack, said second valve is connected in the conduit connected to said second chamber of said support jack and is normally open in the sense which admits fluid to that chamber, said second valve being opened in the opposite sense in response to a predetermined pressure in a conduit connected to the conduit connected to said first chamber of said actuator jack, said third valve is connected in the conduit connected to said second chamber of said support jack between said second valve and said second fluid supply and take-off conduit and is normally open in the sense which permits fluid to be exhausted via said second conduit, said third valve being opened in the opposite sense in response to a predetermined pressure in a conduit connected to a chamber inside said piston rod of said actuator jack which chamber opens into said first chamber of said actuator jack when said piston rod is retracted and opens into a conduit connected to said second chamber of said actuator jack when said piston rod is advanced, and said predetermined pressure at which said first valve is operated is higher than said predetermined pressure at which said second valve is operated.

2. A hydraulic actuating device according to claim 1, wherein said first and second conduits for supply and take-off of hydraulic fluid are adapted to be connected to a source of hydraulic fluid under pressure and to a sink for exhausted hydraulic fluid, through valves which enable either conduit to be connected to the source or the sink.

3. A hydraulic actuating device according to claim 1, wherein said support jack is mounted on the stabilising beam by means of links pivoted to said stabilising beam and to the cylinder of said support jack, and the cylinder of said support jack bears two journals which rest on two ramps mounted on the side walls of said stabilising beam when said support jack is in its stowed position and on which said support jack advances and rotates during movement between its operating and stowed positions.

4. A hydraulic actuating device according to claim 1, wherein said stabilising beam is a telescopic beam including a box girder attached to the chassis of the machine and a support beam which is slidable inside said box girder and which carries said support jack at its free end, said support beam being movable in said supporting box girder by an hydraulic jack arranged with its cylinder pivoted on said box girder and its piston rod pivoted on said support beam.

5. A machine for use on uneven terrain comprising a stabilising beam providing a lateral extension of the chassis of said machine, a support jack mounted on an end of said beam remote from said chassis, said support jack being movable between an operating position in which the jack is vertical and bears on the ground through the intermediary of a sole plate attached to the end of the piston rod of the support jack and a position in which the jack is substantially horizontal and located within the stabilising beam, and an actuating device according to claim 1.

6. A machine according to claim 5, wherein said support jack is mounted on the stabilising beam by means of links pivoted to said stabilising beam and to the cylinder of said support jack, and the cylinder of said support jack bears two journals which rest on two ramps mounted on the side walls of said stabilising beam when said support jack is in its stowed position and on which said support jack advances and rotates during movement between its operating and stowed positions.

7. A machine according to claim 6, wherein said stabilising beam is a telescopic beam including a box girder attached to the chassis of the machine and a support beam which is slidable inside said box girder and which carries said support jack at its free end, said support beam being movable in said supporting box girder by an hydraulic jack arranged with its cylinder pivoted on said box girder and its piston rod pivoted on said support beam.

* * * * *